(12) United States Patent
Oberer

(10) Patent No.: US 12,012,153 B2
(45) Date of Patent: Jun. 18, 2024

(54) AUTOMOTIVE COMPONENT WITH FLANGE AND MOUNTING SCREW

(71) Applicant: BorgWarner Ludwigsburg GmbH, Ludwigsburg (DE)

(72) Inventor: Siegmund Oberer, Berglen-Kottweil (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 699 days.

(21) Appl. No.: 17/143,664

(22) Filed: Jan. 7, 2021

(65) Prior Publication Data

US 2021/0214019 A1 Jul. 15, 2021

(30) Foreign Application Priority Data

Jan. 10, 2020 (DE) ..................... 10 2020 100 438.9

(51) Int. Cl.
*F16B 41/00* (2006.01)
*B62D 27/06* (2006.01)
*F16B 1/00* (2006.01)

(52) U.S. Cl.
CPC .............. *B62D 27/065* (2013.01); *F16B 1/00* (2013.01); *F16B 41/002* (2013.01)

(58) Field of Classification Search
CPC .................................................... F16B 41/002
USPC ........................................................ 411/999
See application file for complete search history.

(56) References Cited

U.S. PATENT DOCUMENTS

| | | | | |
|---|---|---|---|---|
| 3,093,179 A * | 6/1963 | Zahodiakin | ........... | F16B 41/002 411/353 |
| 5,255,647 A * | 10/1993 | Kiczek | ................... | F16B 5/0258 411/533 |
| 6,623,226 B2 * | 9/2003 | Braun | ................... | F16B 41/002 411/970 |
| 7,029,219 B2 * | 4/2006 | Kovac | ................... | F16B 5/0208 411/353 |
| 7,699,571 B2 * | 4/2010 | Booher | .................... | F16B 43/00 411/546 |
| 7,815,408 B2 * | 10/2010 | Sessa | ........................ | F16B 5/02 411/301 |
| 8,439,615 B2 * | 5/2013 | Wu | ....................... | H05K 7/1407 411/107 |
| 8,992,150 B2 * | 3/2015 | Korn | ..................... | F16B 41/002 411/352 |
| 11,319,983 B2 * | 5/2022 | Stanhope | .............. | F16B 41/002 |
| 2004/0062621 A1 * | 4/2004 | Jiang | ..................... | F16B 41/002 411/353 |
| 2006/0056936 A1 | 3/2006 | Ishimaru et al. | | |
| 2014/0356095 A1 * | 12/2014 | Buchen | ................... | F16B 39/24 411/112 |
| 2016/0069364 A1 * | 3/2016 | Montague | ............. | F16B 41/002 411/511 |

FOREIGN PATENT DOCUMENTS

JP S58-13217 A 1/1983
WO WO 2017/118711 A1 7/2017

* cited by examiner

*Primary Examiner* — Flemming Saether
(74) *Attorney, Agent, or Firm* — Bose McKinney & Evans LLP

(57) ABSTRACT

An automotive component is described, comprising a flange, which has a through hole, and a screw, which is inserted in the through hole. According to this disclosure, at least three clamping ribs are provided, extending in an axial direction, in the through hole.

8 Claims, 3 Drawing Sheets

AUTOMOTIVE COMPONENT WITH FLANGE AND MOUNTING SCREW

RELATED APPLICATIONS

This application claims priority to DE 10 2020 100 438.9, filed Jan. 10, 2020, the entire disclosure of which is hereby incorporated herein by reference.

BACKGROUND AND SUMMARY

This disclosure relates to an automotive component comprising a flange, which has a through hole, and a screw, which is inserted in the through hole. An automotive component of this type may be, for example, an ignition coil, an air-conditioning unit, or another component which is installed in a motor vehicle.

Such automotive components are delivered to automotive manufacturers by vendors, and then installed in automobiles during assembly.

This disclosure teaches how installation of such components in automobiles may be facilitated.

An automotive component according to this disclosure enables a pre-mounting of the screw necessary for fastening to a motor vehicle. Advantageously, the screw may be inserted by the vendor into the through hole and frictionally held there by clamping ribs. By means of at least three clamping ribs distributed in the circumferential direction, the screw may be centered in the through hole and held axially aligned. Thus, the screw is aligned for the installation of the component in a motor vehicle, and the automotive component may therefore fixed to the automobile by tightening the screw very quickly and with minimum expense.

An advantageous refinement of this disclosure provides that the clamping ribs each have a length which is greater than the distance between two adjacent thread peaks of the threads of the screw, thus greater than the width of a screw thread of the screw. There is increasingly a risk in the case of shorter clamping ribs that the screw will tilt in the through hole and is thus no longer axially aligned.

Another advantageous refinement of this disclosure provides that the length of the clamping ribs is not more than five times, preferably not more than four times, the distance between adjacent thread peaks of the screw. The longer the clamping ribs are, the less likely that the screw tilts in the through hole. Clamping ribs that are too long are therefore disadvantageous, because it has proven very advantageous if the screw may be tilted somewhat in the through hole opening to compensate for manufacturing tolerances, in order to precisely align the end of the screw. The end facing away from the head of the screw is thereby moved as a rule less than 1 mm, for example, only 0.7 mm or less, as the manufacturing tolerances to be compensated in this way are quite small.

Another advantageous refinement of this disclosure provides that the flange is manufactured by overmolding a sleeve, preferably a metal sleeve, with plastic material, wherein the sleeve has at least one hole, which is filled by the plastic material which forms the clamping ribs and preferably also an annular bead, from which the clamping ribs arise. When the automotive component is mounted on the vehicle, the pressure exerted by a head of the screw may be accommodated by the sleeve. Thus, damage to the flange, otherwise manufactured from plastic material, is prevented. The perforation or hole of the sleeve thereby advantageously enables that the flange and the clamping ribs may be produced in one step, namely by overmolding the sleeve with plastic material. The sleeve preferably has multiple holes, in particular holes or perforations distributed in the circumferential direction. The overmolding and the forming of the annular bead and clamping ribs is advantageously simplified by this means.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
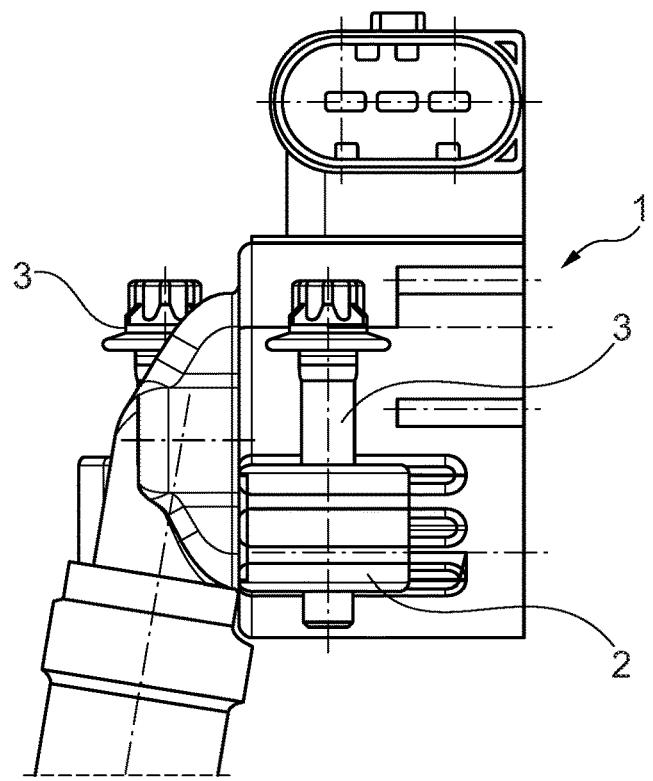
FIG. 1 shows an embodiment of an automotive component according to this disclosure.
Figure 2:
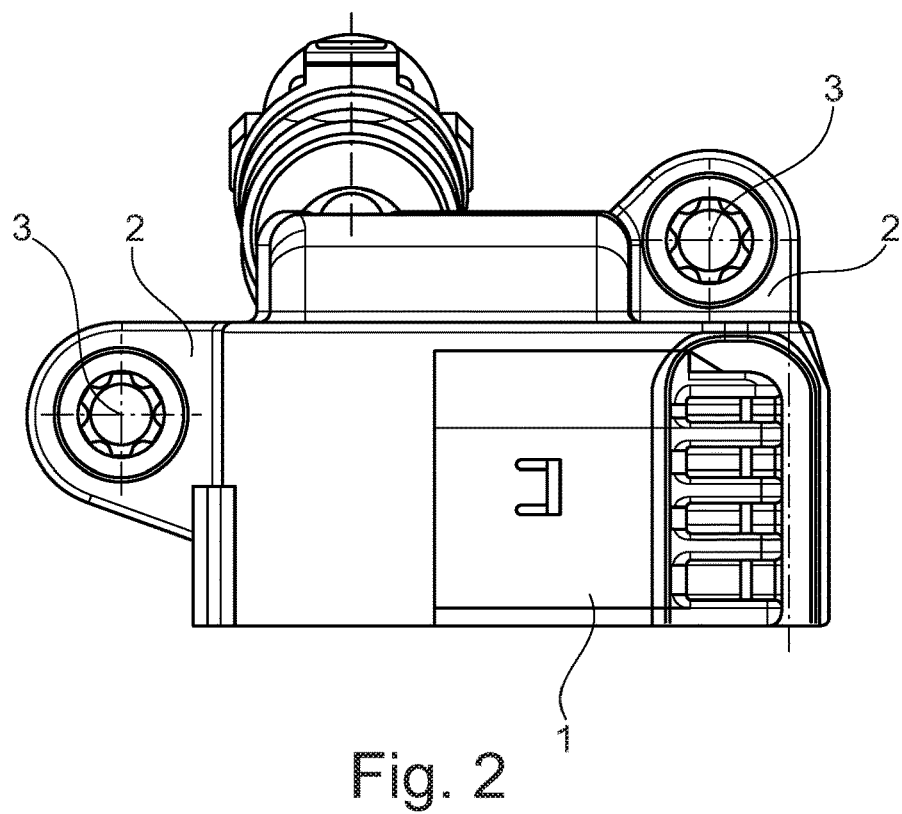
FIG. 2 is another view of the automotive component.

The automotive component 1, shown in FIGS. 1 and 2, is an ignition coil comprising at least one flange 2 for installation in a motor vehicle. The flange 2 has a through hole in which a screw 3 is inserted. The following explanations relate to the pre-mounting of a screw in an automotive component, which, instead of an ignition coil, may also be a unit of a vehicle air-conditioning system or another component, which has a flange with a through hole. The flange may thereby be designed as one piece with a housing of the automotive component.

Figure 3:
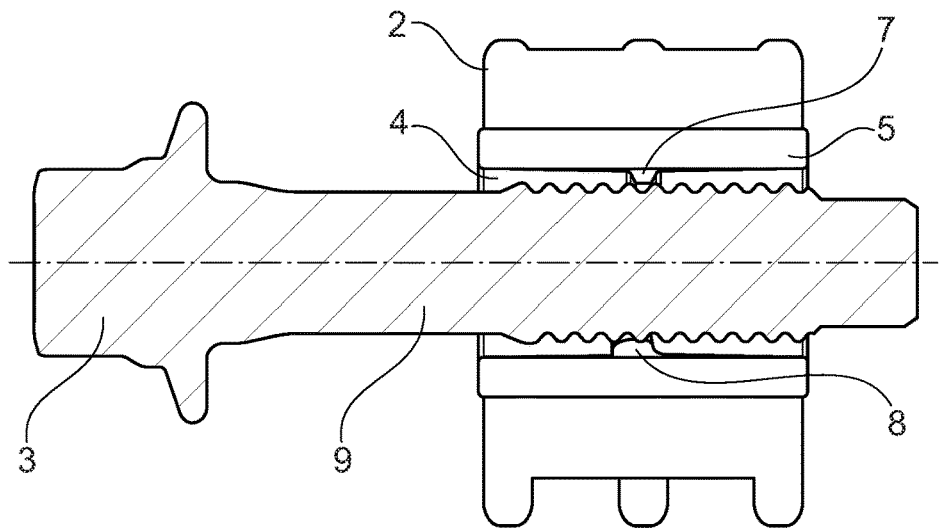
FIG. 3 is a longitudinal view of the flange of the automotive component with screw.
Figure 4:
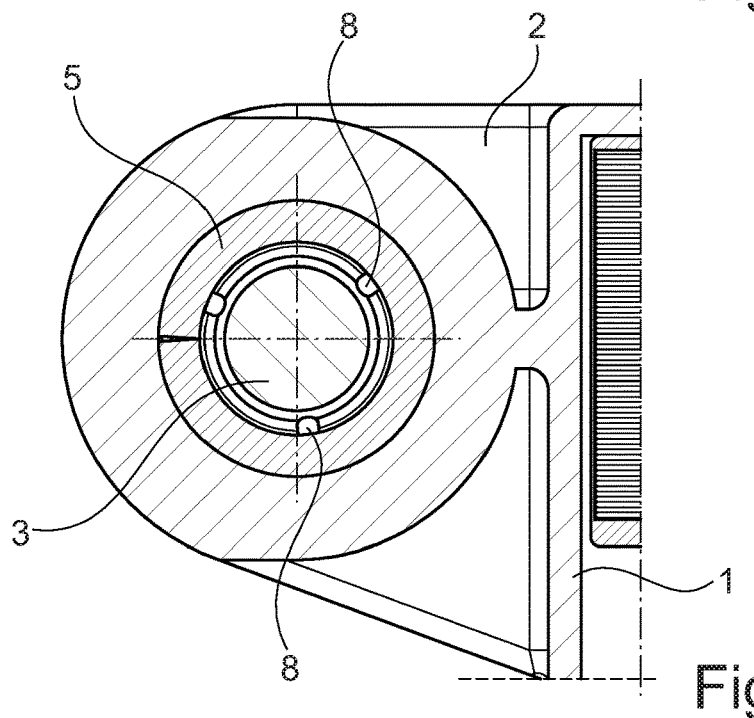
FIG. 4 is a cross section of FIG. 3.
Figure 6:
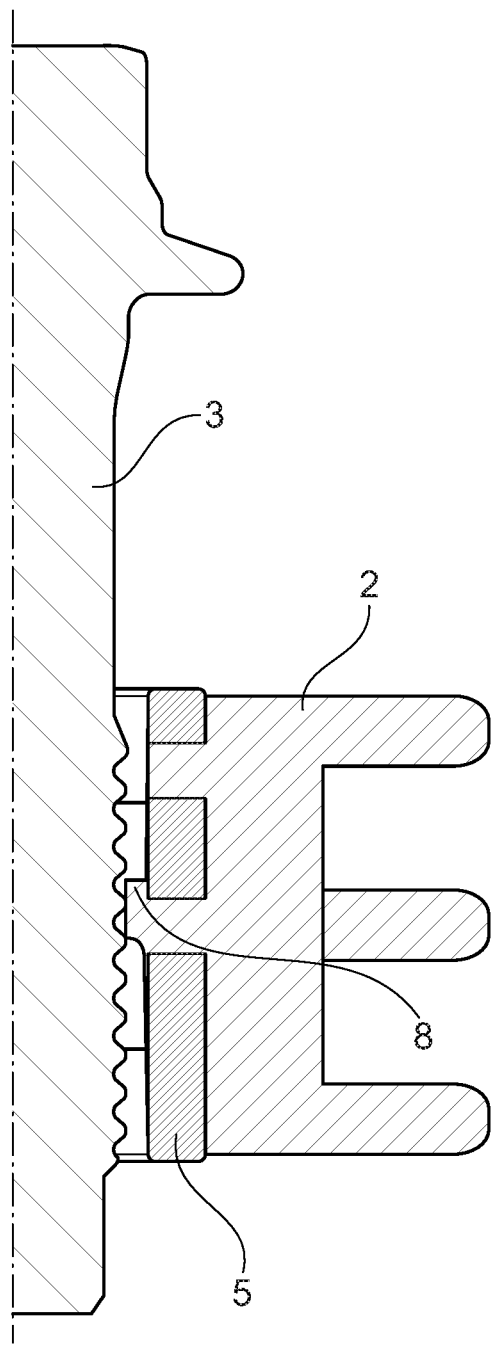
FIG. 6 is another longitudinal view of FIG. 3.

FIG. 3 shows a detail view in a longitudinal cross section of flange 2, which has a through hole 4, in which a screw 3 is inserted. FIG. 4 shows a cross section of FIG. 3, and FIG. 6 shows another longitudinal cross section at another angle.

Figure 5:
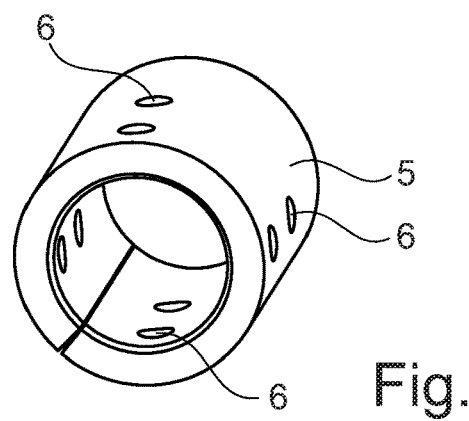
FIG. 5 shows a sleeve contained in the flange.

Flange 2 is manufactured by overmolding sleeve 5, shown in FIG. 5. The sleeve may be made from metal and overmolded with plastic material. Sleeve 5 has holes or perforations 6, through which plastic material may penetrate during the overmolding and form, on the inner side of sleeve 5, and thus on the inner side of through hole 4, an annular bead 7 and clamping ribs 8 arising from annular bead 7 and extending in the axial direction.

In the pre-mounted state, clamping ribs 8 press against the threads of screw 3 and hold the same in an axial orientation. The installation of the ignition coil or another vehicle component with such a flange 2 into a vehicle is thus substantially facilitated by this means. By placing flange 2 at the point provided for the mounting, screw 3, inserted at least at one through hole 4 of flange 2, is then already suitably aligned with the corresponding screw hole. Manufacturing tolerances in the range of tenths of millimeters may be compensated for by minor tilting of screw 3. A screw 3 is thus screwed so far in that screw shaft 9 lies in the area of clamping ribs 8, however is not tightened. Thus, automotive component 1 is still displaceable in order to correct tolerance. Second screw 3 may be screwed in and tightened, the self-centering is carried out in the threads. It is more favorable as a whole, if clamping ribs 8 are not positioned directly on the X and Y axes, so that screw shaft 9 may immerse deeper into the ribbed area.

The shorter clamping ribs 8 are, the easier and farther screw 3 tilts in through hole 4 of flange 2. In order to not unnecessarily complicate an alignment to compensate for manufacturing tolerances, it is therefore advantageous if clamping ribs 8 have a length in the axial direction, which is not more that five times the distance of adjacent thread peaks of the thread of screw 3. Clamping ribs 8 then respectively contact only five or fewer points on the thread of screw 3. In the exemplary embodiment shown, clamping ribs 8 in FIG. 6 contact two points, namely two thread peaks, on the thread of screw 3. The clamping ribs in the exemplary embodiment shown thus have a length that is greater than the width of a screw thread of screw 3.

In the embodiment shown, precisely three clamping ribs 8 are arranged in through hole 4. The number of clamping ribs 8 may namely also be increased; however, no substantial advantages may be achieved thereby.

Screw 3 may have, between its head and the thread, a section with a reduced diameter for example, a thread-free section. The reduced diameter is smaller than an inner diameter delimited by clamping ribs 8, so that clamping ribs 8 may not press against this section of screw 3 when screw 3 is inserted deeper in through hole 4, in particular during or after an end phase of the assembly on a vehicle.

Automobile component 1 is delivered to an automotive manufacture with screw 3, inserted into through hole 4 and held thereby clamping ribs 8, in that these press against the threads of screw 3.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMERALS

1 Automotive component
2 Flange
3 Screw
4 Through hole
5 Sleeve
6 Perforation
7 Annular bead
8 Clamping rib
9 Screw shaft

What is claimed is:

1. Automotive component, comprising:
   a flange having a through hole;
   a screw inserted in the through hole;
   at least three clamping ribs extending in an axial direction arranged in the through hole;
   an inwardly projecting annular bead, from which the clamping ribs arise, arranged in the through hole; and
   wherein the through hole has two ends and the bead and ribs are spaced axially inward from the ends, further wherein the flange is produced by overmolding a sleeve with plastic material that forms the clamping ribs and the sleeve has at least one perforation filled by the plastic material.

2. Automotive component according to claim 1, wherein the clamping ribs have a length greater than the distance between two adjacent thread peaks of the thread of the screw.

3. Automotive component according to claim 1, wherein the clamping ribs have a length that is not more than four times the distance between adjacent thread peaks of the screw.

4. Automotive component according to claim 1, wherein the screw has, between a head and a thread, a section which has a reduced diameter.

5. Automotive component according to claim 1, wherein the sleeve has multiple ones of the perforations filled by the plastic material and the plastic material forms the clamping ribs and forms an annular bead.

6. Automotive component according to claim 1, wherein the annular bead comprises only one single annular bead with clamping ribs.

7. Automotive component according to claim 1, wherein exactly three clamping ribs are arranged in the through hole.

8. Automotive component according to claim 1, wherein the clamping ribs press against the thread of the screw and thereby hold the screw in the through hole.

* * * * *